(12) United States Patent
Zimmer

(10) Patent No.: US 7,899,596 B2
(45) Date of Patent: Mar. 1, 2011

(54) PREVENTIVE SAFETY ACTIVATION IN A VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 739 days.

(21) Appl. No.: 11/720,717

(22) PCT Filed: Oct. 13, 2005

(86) PCT No.: PCT/EP2005/055211
§ 371 (c)(1),
(2), (4) Date: Sep. 6, 2007

(87) PCT Pub. No.: WO2006/058804
PCT Pub. Date: Jun. 8, 2006

(65) Prior Publication Data
US 2009/0171536 A1    Jul. 2, 2009

(30) Foreign Application Priority Data
Dec. 2, 2004    (DE) .................. 10 2004 058 176

(51) Int. Cl.
*B60R 21/24* (2006.01)
(52) U.S. Cl. .................. 701/49; 701/45; 701/36; 340/436
(58) Field of Classification Search .......... 701/1, 701/36, 45, 49; 340/436, 438, 441; 280/734, 280/735, 728.1, 730.2; 180/271
See application file for complete search history.

(56) References Cited

U.S. PATENT DOCUMENTS

| 3,741,584 A | 6/1973 | Arai |
| 6,907,335 B2 | 6/2005 | Oswald et al. |
| 7,158,017 B2 * | 1/2007 | Baur et al. .................. 340/436 |
| 7,188,012 B2 * | 3/2007 | Salmeen et al. ............... 701/45 |

FOREIGN PATENT DOCUMENTS

| DE | 19843042 | 3/2000 |
| DE | 19954637 | 11/2000 |
| DE | 10021142 | 10/2001 |

(Continued)

OTHER PUBLICATIONS

International Search Report from the European Patent Office.

*Primary Examiner*—Richard M. Camby
(74) *Attorney, Agent, or Firm*—Michael Best & Friedrich LLP

(57) ABSTRACT

A method for triggering and transferring a vehicle into a pedestrian preventive safety state to increase the passive safety of the other party in an accident, in which a triggering condition of the pedestrian preventive safety state of the vehicle is generated on the basis of a signal of at least one vehicle sensor, which can indicate a high probability of a vehicle accident, particularly with a pedestrian or a bicyclist, for an immediately imminent time span, and with the presence of a positive triggering condition of the pedestrian preventive safety state, a part or a section of the vehicle, which could inflict additional bodily injury on the other party in the case of an accident with the vehicle, is moved from an area of probable impact with the other party and/or additionally shielded, whereby the vehicle is at least partially transferred to the pedestrian preventive safety state.

19 Claims, 4 Drawing Sheets

FOREIGN PATENT DOCUMENTS

| | | |
|---|---|---|
| DE | 10261870 | 7/2004 |
| DE | 10305857 | 9/2004 |
| DE | 19736840 B4 | 1/2006 |
| JP | 2004299614 A | 10/2004 |
| JP | 2006036015 A | 2/2006 |

* cited by examiner

PREVENTIVE SAFETY ACTIVATION IN A VEHICLE

BACKGROUND OF THE INVENTION

The invention relates to a method for triggering and transferring a vehicle, in particular a motor vehicle, into a preventive safety state to increase the passive safety of the other party in an accident, particularly a pedestrian or a bicyclist.

SUMMARY OF THE INVENTION

According to WHO statistics, 1.26 million people die every year in traffic accidents, and in the EU there are approximately 40,000 deaths and 1.6 million people are injured. Systems that operate at the interface between active and passive safety of the vehicle and prepare occupants and the vehicle for an impact in the case of unavoidable accidents and are thereby able to reduce the severity of injury to occupants are of interest in terms of increasing traffic safety and thus also in terms of reducing the number of victims from traffic accidents.

In this case, in a situation in which an accident is probable, so-called preventive safety systems utilize the time before a vehicle accident in such a way that the vehicle switches from a comfort mode to a safety mode. The safety mode is preferably activated in a critical driving condition, which, e.g., can be detected on the basis of signals from an antilock system or an ESP system. If the sensors register a critical driving situation, then, e.g., the seat belts will be pulled tauter, the seats will move into a more favorable position for a vehicle impact and, in the case of a vehicle rollover, the sunroof will close in order to prevent the intrusion of objects that might also injure the occupants.

Furthermore, preventive safety systems are known that initiate preventive safety measures for the other party in an accident during a collision of the vehicle with a pedestrian or a bicyclist on the basis of a contact sensor, which is housed, e.g., in a fender or a bumper.

Thus, a windshield wiper device for a motor vehicle is known from DE 103 05 857 A1 in which a wiper lever is moved into a position below the windshield of the vehicle when a contact sensor detects the impact of a pedestrian with the vehicle. As a result, the wiper arm disappears from a danger zone for the pedestrian, which minimizes his risk of injury in an impact with the windshield. In a preferred embodiment, the engine hood also lifts up in the area of the windshield, thereby creating more space for the wiper lever to disappear, on the one hand, and, on the other hand, making more deformation space available for the pedestrian involved in the accident, who either no longer comes into contact with the hard parts of the engine under the engine hood or to a lesser degree.

The use of contact sensor technology is suitable primarily for vehicles in the luxury class with longer engine hoods. Using contact sensor technology for compact vehicles with shorter engine hoods (e.g., a subcompact car or a van), particularly if the other party in the accident is small (e.g., a child), is no longer suitable in the foregoing circumstances since the time period between the triggering of the contact sensory technology by the other party in the accident and the impact of his head is too short, e.g., to lower the wiper lever of the windshield wiper device in enough time.

As a result, an objective of the invention is determining and initiating preventive safety measures of a vehicle for the other party in an accident in such a way that these measures have already been initiated before the other party has even had any physical contact with the vehicle. In particular, the preventive safety measures of the vehicle can be undertaken in such a way that, if an impact does take place, even in an impact between a vehicle with a short engine hood and a child, the remaining time is adequate for concluding the preventive safety measures before the impact or to initiate these measures before the initial contact of the child with the vehicle, but not to conclude them until after the initial contact of the child with the vehicle but still before an additional impact of the child (windshield, engine hood).

The objective of the invention is attained in that in a situation in which an accident will occur with a certain probability in the near future, the vehicle prepares for an impending collision. This lead time directly before an accident can be three seconds or more, which can be utilized to initiate a preventive safety state of the vehicle even for the other party in an accident. In this case, sensor information from the vehicle that can indicate a high accident probability of the vehicle with a third party is used to generate a triggering condition of the preventive safety state. This so-called pedestrian preventive safety state of vehicle is assumed at least partially before the initial impact of the third party with the vehicle, wherein, e.g., at least a part or a section of the vehicle is removed from an accident-prone area or is additionally shielded, which can substantially minimize the risk of injury to the third party.

By extending the window of time for the vehicle to assume the pedestrian preventive safety state, it is possible, due to the additional time that is available as compared to the prior art, to undertake comprehensive preventive safety measures on the vehicle for the pedestrian or others.

Furthermore, depending upon the preventive safety measure, it can be initiated comparatively slowly and therefore gently and with little noise. In addition, already existing anticipatory sensor systems can be used to active the preventive safety state.

In a preferred embodiment of the invention, the vehicle also executes automatically triggered and preferably also automatically controlled full braking. On the one hand, this makes it possible perhaps to prevent completely an impending accident since the reaction time span of the vehicle electronics is much shorter as compared with human reaction times. And, on the other hand, an accident that could not be avoided will take place at a lower speed, a fact that substantially minimizes the risk of injury to a third party.

In a preferred embodiment of the invention, this type of pedestrian preventive safety measure of the vehicle is a lowering of a windshield wiper device. In this case, preferably at least one wiper lever of the windshield wiper device is lowered into an area below a customary resting position of the wiper lever. According to the invention, a timely lowering of the wiper lever in the case of collisions with short head impact times (time span between the collision of the vehicle with the other party and the impact of his head on the vehicle) is guaranteed, particularly when a vehicle with a short front collides with a child.

Using the method in accordance with the invention, it is possible, e.g., to trigger the wiper lever exclusively via an anticipatory sensor system and, with the presence of corresponding accident criteria, to remove the wiper lever of the windshield wiper device preventatively from an area that is dangerous for the other party in an accident without contact with the other party occurring. If a collision does then occur, the wiper levers can no longer be a hazard at all to the third party. This type of preventative, automatic lowering of the wiper lever to protect pedestrians is possible with today's wiper system technology. Mechatronic systems, i.e., wiper linkages with electrically regulated reversing motors (single-motor or double-motor technology) or wiper systems with a direct drive (wiper direct drive with integrated electronics), can be used to lower wiper levers.

In a preferred embodiment of the invention, a front hood of the vehicle is lifted up into an area in the vicinity of the windshield on the basis of pedestrian preventive safety activation conditions. This makes it possible to enlarge the crumble zones for the other party in the accident, who is better shielded from the hard motor parts in the interior of the vehicle.

In a preferred embodiment of the invention, the windshield wiper device, preferably its wiper lever, disappears, during its downward movement, under the raising front hood. In this case, the movement of the windshield wiper device that is directed downwardly and the movement of the front hood that is directed upwardly are coordinated with one other so that a collision of the front hood and the windshield wiper device is avoided.

The information to determine a triggering condition for the pedestrian preventive safety state of the vehicle originates from at least one anticipatory sensor. In this case, an anticipatory sensor should be understood as a sensor that can indicate an impending accident of the vehicle with a certain probability. This type of sensor is, e.g., a deceleration measuring sensor, which indicates an impending accident when full braking is detected. In just the same way, a sensor from an ESP system or a sensor of an antilock system can indicate a critical driving condition of the vehicle. Moreover, radar devices, camera systems or IR sensors are suitable for detecting the ambient field of the vehicle. If a radar device is used for detection, then a so-called short-range radar that can view approx. 5-10 m away from the vehicle, is preferred.

A combination of a plurality of sensors, which can indicate a certain accident probability, is preferred. Thus, e.g., a lowering of the wiper lever should take place when, on the one hand, a sensor detects an approaching pedestrian and, on the other hand, a braking sensor detects full braking. Moreover, this can also be executed in combination with a critical vehicle condition, which is indicated by the ESP sensor. In addition, a lowering of the wiper lever is also possible only when full braking is detected since it ensues preferably reversibly.

In a preferred embodiment of the invention, the preventive safety activation system of the vehicle is supported by a contact sensor, which can detect an impact of a third party or an object. These types of contact sensors are situated, e.g., in the fenders and bumpers of the vehicle.

The use of this type of contact sensor allows the preventive safety activation strategy for pedestrian protection to be perfected further. As a result, it is possible, e.g., when detecting a pedestrian in a critical driving situation, to initiate the preventive safety activation of the vehicle and start, e.g., the lowering of the wiper levers, which is possible comparatively slowly, gently and with little noise. If the vehicle then detects, via the contact sensor, a collision with a pedestrian, then the wiper motor should receive a maximum flow of current, whereby the wiper lever disappears as quickly as possible from a danger zone. It is preferred that the wiper lever be moved against a solid limit stop in this case. On the one hand, this course of action makes high passive safety of the other party in an accident possible and, on the other hand, a high degree of reversibility of the actuating technology. If detection does not take place via the contact sensor, then it is easily possible to move the wiper lever back into its original resting position without requiring a manual reset or a visit to the repair shop for this purpose. However, if the contact sensor detects a collision, then the wiper lever is moved away at maximum speed. The same process can also be used, e.g., with the front hood of the vehicle, wherein for pedestrian preventive safety activation of the vehicle without a signal from a contact sensor, springs can be used for triggering and control motors for restoring the front hood, whereas with a signal from a contact sensor, e.g., a blasting cartridge can be used to activate the front hood.

Suitable as a reversible actuator in a pedestrian preventive safety activation is e.g., the triggering of the wiper motor. Reversible lowering of the wiper lever is required since a collision does not also occur every time there is a pedestrian preventive safety activation.

In a preferred embodiment of the invention, the decision to lower, e.g., the windshield wiper device, is made by the control electronics of windshield wiper motor, thereby saving time as compared to conventional signal processing in the vehicle computer.

BRIEF DESCRIPTION OF THE DRAWINGS

The invention will be explained in greater detail in the following on the basis of exemplary embodiments in the enclosed drawings. The drawings show.

DETAILED DESCRIPTION

The following remarks relate mainly to lowering a wiper lever 12 of a windshield wiper system into a position below its lowest resting position and/or the raising of a vehicle front hood 20 during a pedestrian preventive safety activation of a motor vehicle, i.e., they relate to an application of the method in accordance with the invention in an embodiment according to FIG. 5. However, it should be noted at this point that other passive protective measures, especially for pedestrian and bicyclists, can be undertaken using the method in accordance with the invention. Thus, it is possible, e.g., when transferring a vehicle into a pedestrian preventive safety state, to remove or shield other parts or sections of the vehicle, such as the vehicle antenna, mirrors and similar projecting parts, from a danger zone in an accident situation for third parties by using the method in accordance with the invention.

Figure 1:
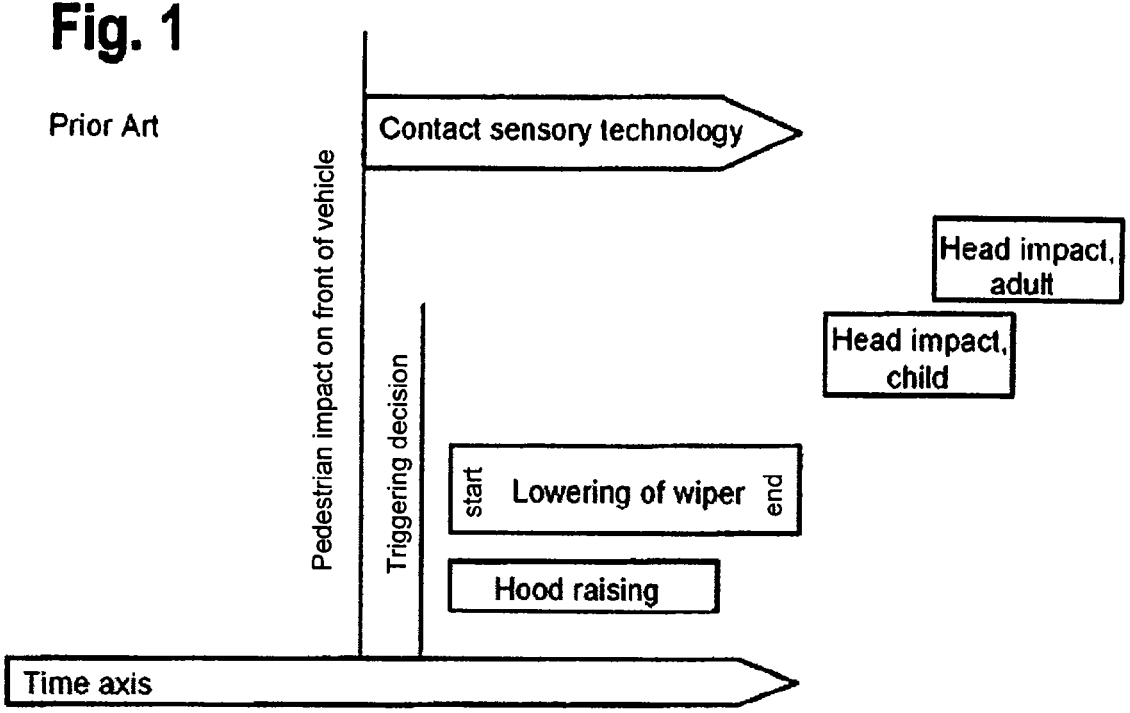
FIG. 1 A graphic representation of a method for pedestrian preventive safety activation of a vehicle in accordance with the prior art.

FIG. 1 shows a graphic representation of a method in accordance with the prior art to lower a wiper lever and raise the hood by means of contact sensory technology that is located in a forward area of the vehicle. At a certain point in time, the contact sensory technology registers an impact of a pedestrian on the front of the vehicle, wherein immediately thereafter a triggering decision is made for lowering the wiper and raising the hood. Directly after the pedestrian impact, in a standard accident situation (frontal impact with a pedestrian), the head of the pedestrian 40 impacts the engine hood 20 or the windshield 30 (also see FIG. 5), wherein a head impact of a child or a small person will occur sooner timewise than a head impact of an adult.

In the case of vehicles with longer engine hoods 20 and a collision with a normal-sized adult pedestrian, the time span available between triggering the contact sensory technology and the head impact is still adequate enough to lower the wiper lever 12 and raise the engine hood 20 sufficiently. If a vehicle with a shorter horizontal or vertical engine hood 20 (subcompact car, van or truck) is involved in this type of accident and/or if this type of accident takes place with a child, then a head impact will occur considerably sooner, whereby the remaining time is no longer adequate to lower the wiper lever 12 or to raise the hood far enough.

Figure 2:
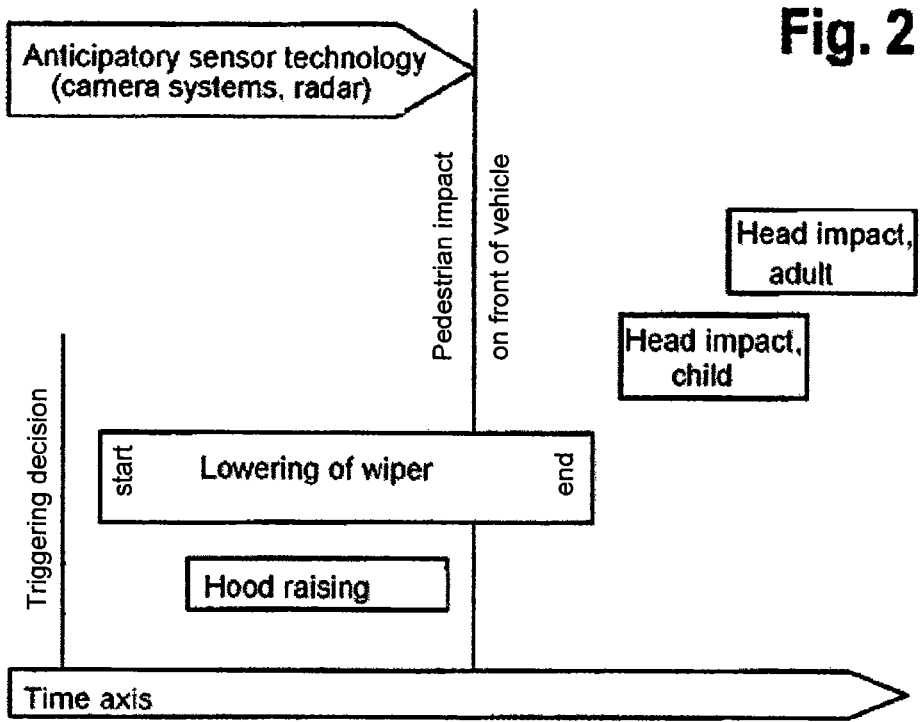
FIG. 2 A graphic representation of a method for pedestrian preventive safety activation of a vehicle in accordance with the invention.

FIG. 2 shows an embodiment of the method in accordance with the invention. In the case of the invention, the triggering decision or triggering condition A for lowering the wiper lever and/or raising the hood is now made before an impact of a third party 40 on the front of the vehicle. The resulting additionally available time is now used in such a way that, before the actual impact of the third party 40, the wiper levers 12 or the entire windshield wiper device are lowered and/or the front hood 20 is raised into an area near the windshield 30. If a head impact of a child or an adult now occurs (particularly in the case of vehicles with shorter or vertical engine hoods), the wiper levers have already moved out of the danger zone and/or the hood is raised completely.

This is realized preferably by means of anticipatory sensory technology, which makes it possible to make a corresponding triggering decision. Once this triggering decision has been made, the vehicle is transferred into a pedestrian preventive safety state in which the vehicle prepares for an accident with an outside third party 40 and in doing so configures itself so that the risk of injury for this third party 40 is as low as possible. This sort of anticipatory sensory technology is, e.g., a camera, a radar or an IR sensor, which can detect pedestrians 40 in a close ambient field around the vehicle. Also suitable are sensor data from ESP sensors (e.g., the start of regulation of the ESP system, which indicates a critical driving condition) or, e.g., from sensors of an antilock system. Detecting full braking or even a standstill of the wheels (e.g., with locked-up steering and an icy driving surface) is also information, which can indicate an impending accident. A combination of these sensor signals is naturally meaningful.

In addition, when using anticipatory systems for pedestrian protection that monitor the area around the vehicle and if the sudden appearance of a pedestrian 40 is detected, it is possible to trigger full braking automatically and simultaneously lower the wipers 12 and/or raise the hood 20. On the one hand, this makes it possible to prevent the accident perhaps even on the basis of the very sort reaction time by the onboard computer via full braking or, if the accident is unavoidable, to allow it to occur at a lower speed, thereby greatly minimizing the risk of injury to third parties.

Since an accident cannot be detected in advance with 100% reliability, it is advantageous in the case of the embodiments in accordance with the invention if the measures undertaken are reversible. In particular, the measures undertaken should be reversible in such a way that they are possible automatically, e.g., via an electric motor for the engine hood 20 or via the wiper motor for the lowering the wiper lever, or at least manually without using tools. It is preferred in the case of windshield wiper devices that the wiper motor (WSM or wiper direct drive) is triggered as a reversible actuator. In other words, on the one hand, the wiper motor assumes normal wiper operation when it is raining, but, on the other hand, it possible for it to move the wiper lever 12 into its preventive safety position. In this case, the reversible lowering of the wiper lever should take place without reverse movement against a solid limit stop since, as described above, a collision with a third party does not take place after every situation is detected and reverse movement against a solid limit stop could damage the wiper 12.

Figure 3:
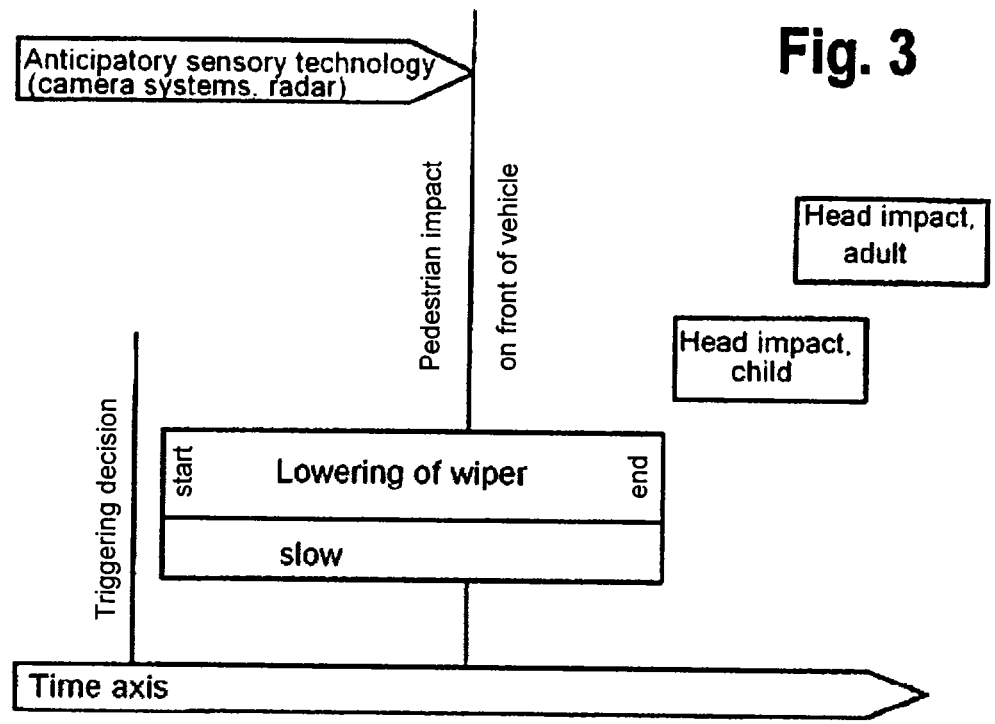
FIG. 3 A graphic representation of another embodiment of the method in accordance with the invention.

This type of embodiment of reversible lowering of the wiper lever without reverse movement is depicted in FIG. 3. With such an embodiment, the wiper lever 12 is lowered comparatively slowly after a positive triggering decision A, wherein the time that is available to it is adequate for complete lowering before a head impact occurs. This type of embodiment is suitable when, e.g., a positive triggering decision A is made as early as possible; whereby this decision is, in turn, more imperfect than a subsequent triggering decision A, when less time is available for lowering the wiper. Since this triggering decision A is imperfect, it is necessary to trigger the wiper motor reversibly.

Figure 4:
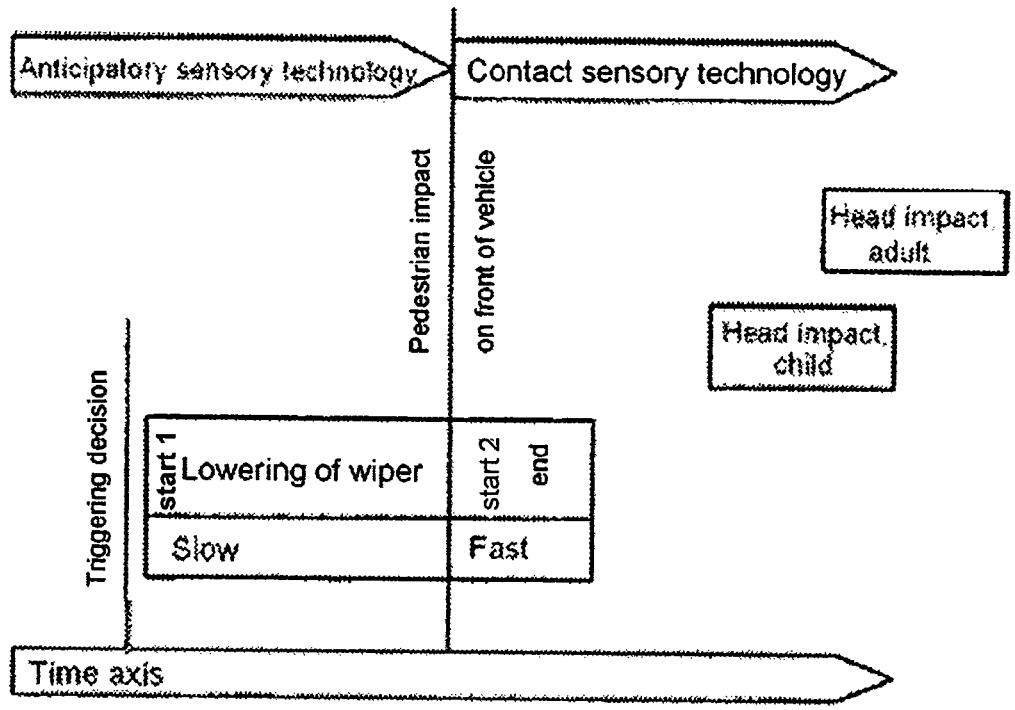
FIG. 4 Another graphic representation of an embodiment of the method in accordance with the invention.

Another embodiment of the invention is depicted in FIG. 4 in which anticipatory sensory technology is combined with contact sensory technology. This embodiment of the invention functions like the one just described, except that from the point in time at which the contact sensory technology registers a collision, i.e., from a point in time at which there is a 100% probability of an accident, the speed at which the pedestrian preventive safety state of the vehicle is assumed is increased or maximized. In this case, e.g., the wiper motor is fully energized, whereby the wiper lever 12 moves downward at a maximum speed and preferably against a solid limit stop. A similar procedure can be used with the front hood 20, in which when a collision is detected, e.g., blasting cartridges are ignited, which move the front hood 20 as quickly as possible into its upper position.

Figure 5:
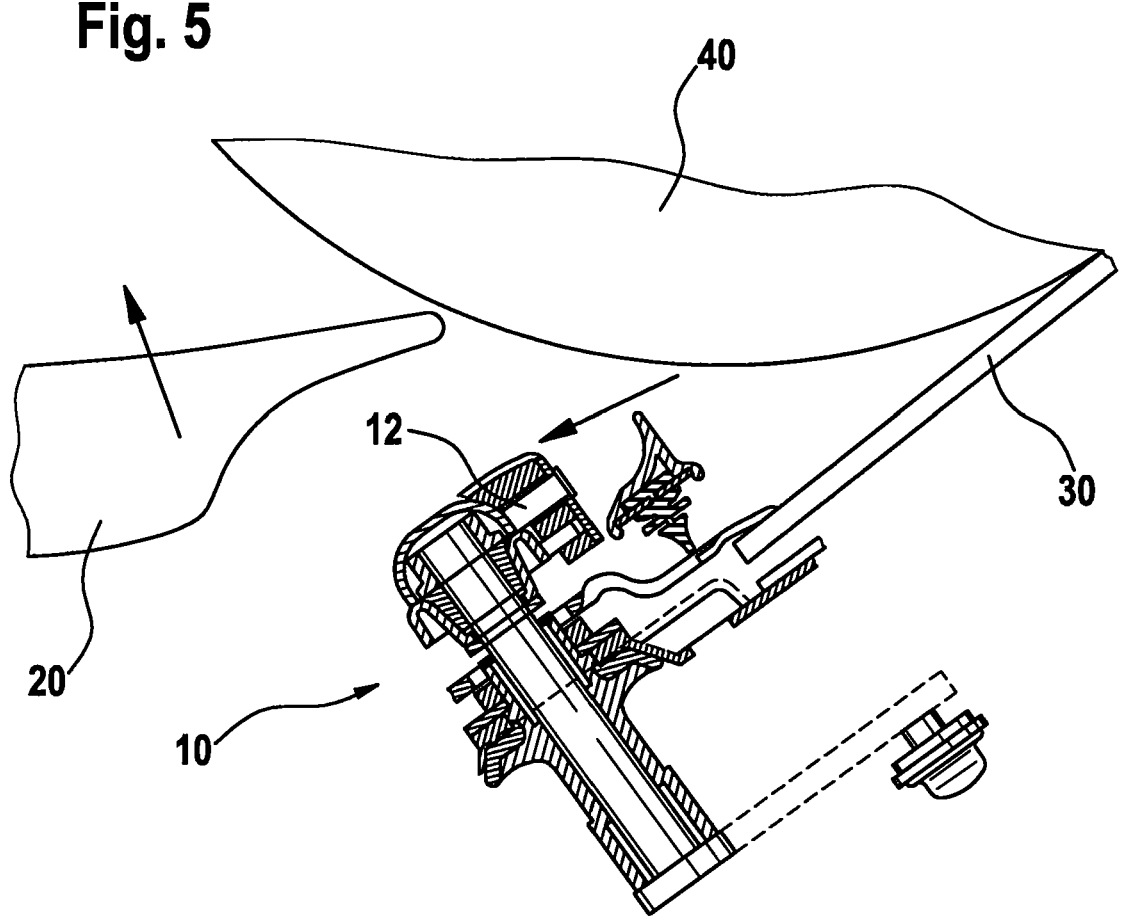
FIG. 5 An embodiment of pedestrian preventive safety activation of the vehicle in which a wiper lever is lowered and a front hood is raised.

FIG. 5 depicts the pedestrian 40 after a collision with a motor vehicle, wherein the head of the pedestrian 40 impacts the windshield 30 in the most unfavorable case. In the depicted situation, the vehicle is in its pedestrian preventive safety state, wherein, by means of the method in accordance with the invention, even before the collision, the engine hood 20 was lifted up and the wiper lever 12 of a windshield wiper device 10 was positioned below a windshield 30. As a result, the head of the pedestrian 40 can no longer be injured by a wiper lever 12.

Figure 6:
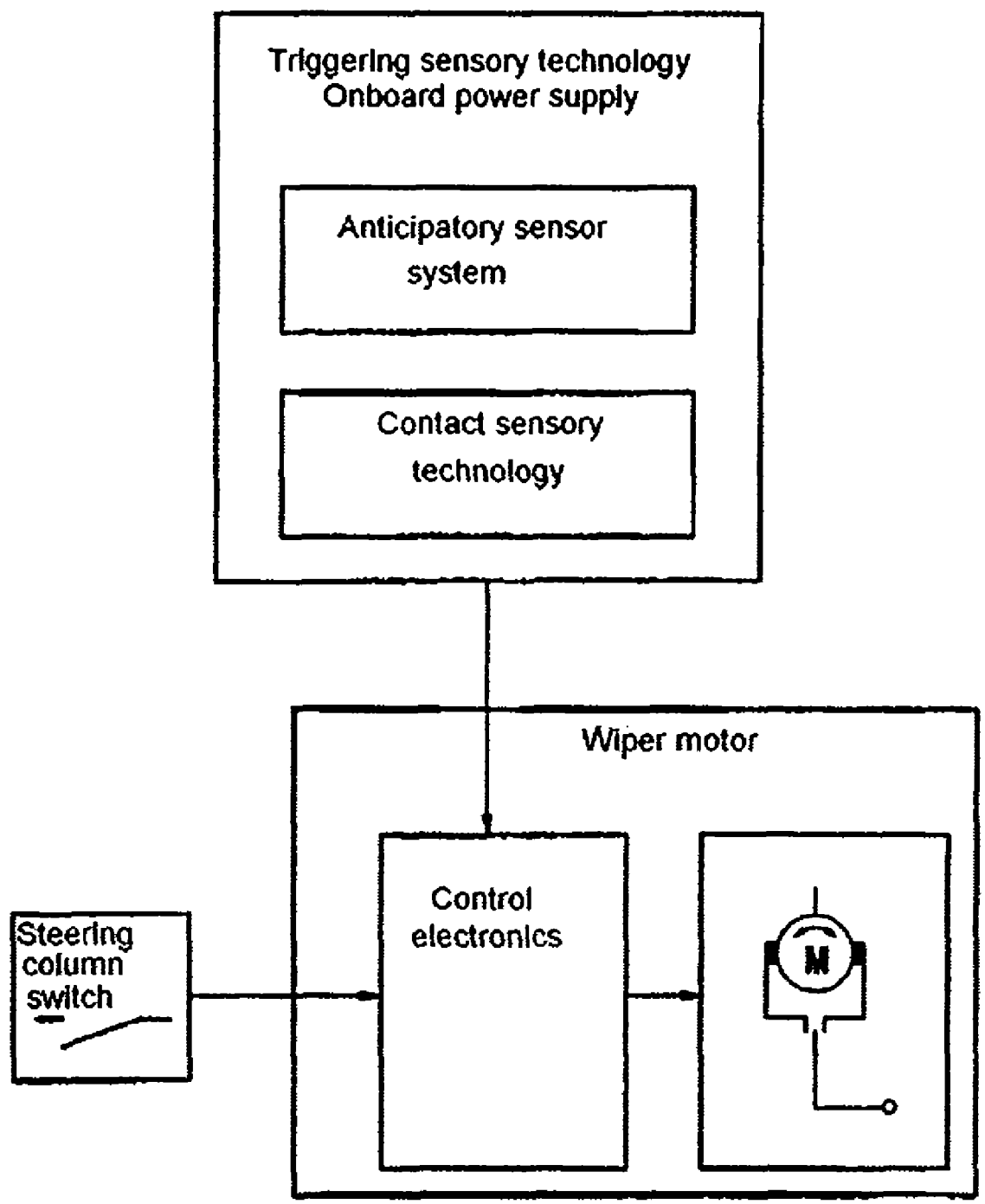
FIG. 6 A block diagram for positioning a wiper lever by means of the control electronics of a wiper motor.

FIG. 6 shows a block diagram of an embodiment of the method in accordance with the invention, wherein the control electronics of a wiper motor can also process sensor information from the vehicle at the input side along with the wiper information from the steering column switch. In this case, the control electronics decide whether the wiper lever 12 is lowered into its pedestrian preventive safety state.

Preventive safety detection of a critical driving condition of the vehicle is the detection of full braking in particular. In such a situation, the wiper motor is triggered as a reversible actuator, wherein the processing of the sensor or triggering signal takes place in the wiper motor electronics (see FIG. 6); in this case, the existing wiper system mechatronics are used, which is present in the case of a wiper linkage with an electronically regulated reversing motor (WSM2M) or a wiper direct drive. In the process, the wiper drive lowers the wiper lever 12 into a lower position. An important factor is the period of time that the sensor system needs to generate the triggering decision A. The greater this period of time is, the more time the actuator has with respect to lowering the wiper lever 12. Because of the long time span in accordance with the invention between detection (full braking) and the collision with the pedestrian (contact sensory technology), the wiper levers 12 can be lowered in a timely manner. This lowering of the wiper levers can take place at the beginning, i.e., relatively slowly without running against a solid limit stop. This lowering is reversible and functions with little noise. This is necessary since a collision with a pedestrian 40 does not also occur every time a situation is detected. After a pedestrian impact is detected by means of contact sensory technology, the wiper motor must be fully energized and moved against a solid limit stop in order put the wiper lever 12 into its lowest position as quickly as possible. Since both accident situations described can occur, it is meaningful to take both cases into consideration.

Using the method in accordance with the invention, the possibility exists via preventative measures to increase the safety of third parties and to guarantee the highest possible passive safety.

It is preferred that wiper lever lowering in accordance with the invention be possible in all states of the wiper lever 12. In particular, this should be possible in the resting phases of the wiper (also in extended parking position or intermittent parking position). Furthermore, it is meaningful, in the case of pedestrian preventive safety activation of the vehicle, to suppress possible wiping of the windshield wipers so that the wiper levers are not situated on the windshield during an impact with a pedestrian. On the other hand, so as not to endanger the safety of the vehicle occupants, it is conceivable, e.g., during heavy rain, to guarantee continued wiping of the wiper blades despite lowering of the wiper levers so that the driver still has adequate sight for evasive maneuvers and once the contact sensory technology is triggered, wiping is discontinued, preferably in a resting position of the wiper lever 12.

The invention claimed is:

1. Method for triggering and transferring a vehicle into a pedestrian preventive safety state to increase the passive safety of another party in an accident,
   in which a triggering condition (A) of the pedestrian preventive safety state of the vehicle is generated on the basis of a signal of at least one vehicle sensor, which can indicate a high probability of a vehicle accident, for an immediately imminent time span, and
   with the presence of a positive triggering condition (A=+) of the pedestrian preventive safety state, a part or a section of the vehicle, which could inflict additional bodily injury on the other party in the case of an accident with the vehicle, is moved from an area of probable impact with the other party and/or additionally shielded, whereby the vehicle is at least partially transferred into the pedestrian preventive safety state, and the positive triggering condition (A=+) comprises two signals, wherein
   via a signal generated by an anticipatory sensor, the respective part or section of the vehicle is put into a preventive safety activation, and via a signal generated by a contact sensor, the respective part or section of the vehicle is put into the pedestrian preventive safety state.

2. Method according to claim 1, wherein the vehicle also executes an automatically triggered full braking.

3. Method according to claim 1, wherein, when transferring the vehicle into the pedestrian preventive safety state, a windshield wiper device (10), preferably a wiper lever (12) of a front windshield wiper, is at least partially lowered into an area below its functional position.

4. Method according to claim 1, wherein, to create additional deformation space for the other party in an accident, when transferring the vehicle into the pedestrian preventive safety state, a front hood (20) of the vehicle is lifted up into an area which is near the windshield (30).

5. Method according to claim 4, wherein the wiper lever (12), during its downward movement, at least partially disappears under the raising front hood (20), and the raising of the front hood (20) and the descending of the wiper lever (12) are coordinated with each other in terms of time preferably to avoid a collision between the wiper lever (12) and the front hood (20).

6. Method according to claim 1, wherein the information to generate the triggering condition (A) originates from at least one signal of a time-related anticipatory sensor or a linkage of a plurality of signals from anticipatory sensors, wherein at least one of the anticipatory sensors is a deceleration measuring sensor, a wheel sensor of an antilock system, an IR sensor, an ESP sensor, a camera system or a radar device.

7. Method according to claim 1, wherein a sufficient criterion for triggering the pedestrian preventive safety state of the vehicle is a strong deceleration in the vehicle, or a critical driving condition of the vehicle together with the detection of a person outside the vehicle.

8. Method according to claim 1, wherein, in addition, a signal of a contact sensor, particularly to detect a pedestrian impact, is taken into consideration during the transition of the vehicle to the pedestrian preventive safety state and when detecting an impact by means of the contact sensor, the part or the section of the vehicle, which could inflict additional bodily injury on the other party in the case of an accident with the vehicle, preferably the wiper lever (12), is moved away from the danger zone at maximum speed and preferably against a solid limit stop.

9. Method according to claim 1, wherein the vehicle measures that can be initiated for the pedestrian preventive safety state are reversible in particular if the detection reliability of a pedestrian impact is less than 100% for the vehicle, preferably directly after a near accident.

10. Method according to claim 3, wherein a decision to lower the wiper lever (12) in the pedestrian preventive safety state is made by the control electronics of the windshield wiper motor.

11. Method according to claim 2, wherein, when transferring the vehicle into the pedestrian preventive safety state, a windshield wiper device (10), preferably a wiper lever (12) of a front windshield wiper, is at least partially lowered into an area below its functional position.

12. Method according to claim 11, wherein, to create additional deformation space for the other party in an accident, when transferring the vehicle into the pedestrian preventive safety state, a front hood (20) of the vehicle is lifted up into an area which is near the windshield (30).

13. Method according to claim 12, wherein the wiper lever (12), during its downward movement, at least partially disappears under the raising front hood (20), and the raising of the front hood (20) and the descending of the wiper lever (12) are coordinated with each other in terms of time preferably to avoid a collision between the wiper lever (12) and the front hood (20).

14. Method according to claim 13, wherein the information to generate the triggering condition (A) originates from at least one signal of a time-related anticipatory sensor or a linkage of a plurality of signals from anticipatory sensors, wherein at least one of the anticipatory sensors is a deceleration measuring sensor, a wheel sensor of an antilock system, an IR sensor, an ESP sensor, a camera system or a radar device.

15. Method according to claim 14, wherein a sufficient criterion for triggering the pedestrian preventive safety state of the vehicle is a strong deceleration in the vehicle, or a critical driving condition of the vehicle together with the detection of a person outside the vehicle.

16. Method according to claim 15, wherein, in addition, a signal of a contact sensor, particularly to detect a pedestrian impact, is taken into consideration during the transition of the vehicle to the pedestrian preventive safety state and when detecting an impact by means of the contact sensor, the part or the section of the vehicle, which could inflict additional bodily injury on the other party in the case of an accident with the vehicle, preferably the wiper lever (12), is moved away from the danger zone at maximum speed and preferably against a solid limit stop.

17. Method according to claim 16, wherein the vehicle measures that can be initiated for the pedestrian preventive safety state are reversible in particular if the detection reliability of a pedestrian impact is less than 100% for the vehicle, preferably directly after a near accident.

18. Method according to claim 17, wherein a decision to lower the wiper lever (12) in the pedestrian preventive safety state is made by the control electronics of the windshield wiper motor.

19. Method according to claim 11, wherein a decision to lower the wiper lever (12) in the pedestrian preventive safety state is made by the control electronics of the windshield wiper motor.

* * * * *